United States Patent [19]
Smith

[11] 3,851,860
[45] Dec. 3, 1974

[54] PITCHER

[76] Inventor: Larry Charles Smith, 22916 Juniper Ave., Torrance, Calif. 90505

[22] Filed: Apr. 3, 1972

[21] Appl. No.: 240,583

[52] U.S. Cl. ................................ 259/55, 220/20
[51] Int. Cl. ............................................ B01f 11/00
[58] Field of Search ............ 259/54, 55, 60, 72, 73; 220/20, 20.5; 206/47 A; 215/6

[56] References Cited
UNITED STATES PATENTS
2,170,311  8/1939  Smith .................................. 220/20
2,215,691  9/1940  East .................................... 220/20

*Primary Examiner*—Robert W. Jenkins

[57] ABSTRACT

This disclosure relates to pitchers for holding liquids, and more specifically to a pitcher having a receptacle adapted to receive a container of frozen juice concentrate. The opened container is left in the receptacle with the open end down while the concentrate is allowed to thaw and flow into the main chamber of the pitcher. Subsequent removal of the container and addition of water simultaneously dilutes and mixes the concentrate within the main chamber. Additional mixing is accomplished by tilting the pitcher back and forth so that the liquid flows between the receptacle and the main chamber.

4 Claims, 9 Drawing Figures

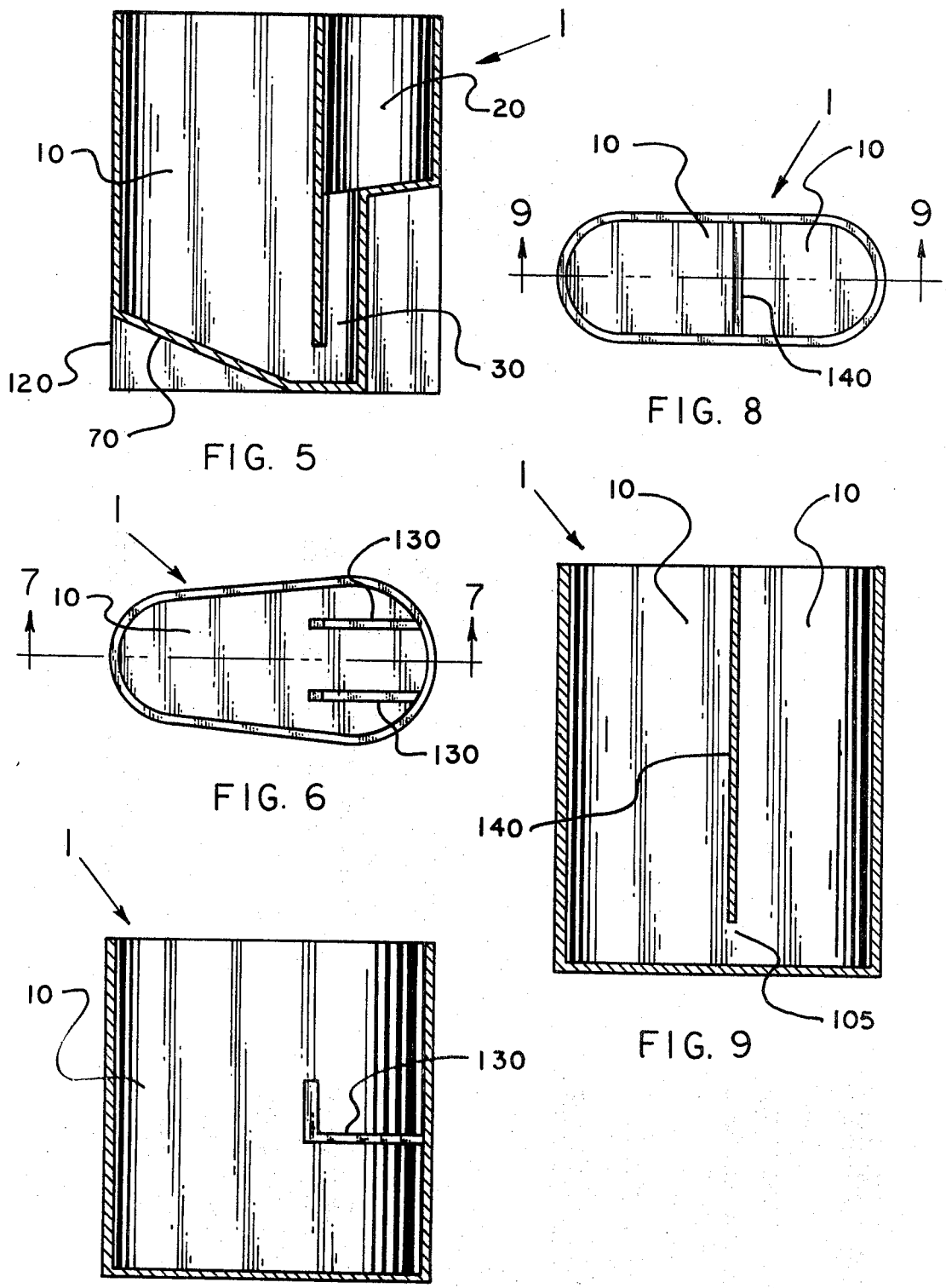

PITCHER

BACKGROUND OF THE INVENTION

1. Field of the Invention

This invention is a pitcher for conveniently thawing and mixing frozen juice concentrates. It comprises a main chamber to hold most of the finally mixed juice, and a receptacle to hold the container of juice concentrate while it thaws. As the concentrate thaws it flows into the main chamber. Removal of the container and subsequent addition of water dilutes and mixes the concentrate with water in the main chamber. The receptacle sides and bottom may be closed except for a passage from the bottom of the receptacle to the bottom of the main chamber. Such passage directs the water directly to the bottom of the main chamber to enhance the mixing of the water with the concentrate. It also provides a pumping action between the receptacle and the bottom of the main chamber when the pitcher is tilted in a direction toward or away from the receptacle.

2. Description of the Prior Art

With the advent of high speed injection molding of plastics, pitchers with many sizes and shapes, and with a variety of handle and spout designs have become available. Considerable attention has also been given to the design of dependable leak proof lids. However, in spite of all these improvements, a pitcher for conveniently preparing frozen juice concentrates is still not available.

There are so many different methods of preparing frozen juice concentrates that they are not discussed here in detail, but it is pointed out that in general they all tend to be messy or somewhat inconvenient. The mess usually occurs from using stirring utensiles that drip when removed from the pitcher, lids and spouts that leak when the stirring is done by shaking the pitcher, splatters from attempting to crush lumps of the frozen concentrate with a spoon, and by spilling cans of concentrate that were to be thawed before being poured into the pitcher. Inconvenience is most acute when trying to remove the concentrate from the container while it is still frozen and sticking to the inner walls of the container. Searching for frozen lumps of concentrate and trying to smash them with a spoon so they will mix with the water is also an inconvenience.

This invention reduces the mess and inconveniences cited above when preparing frozen juice concentrates. The container of frozen concentrate is opened and placed within the pitcher while the concentrate is still frozen; no mess or inconvenience. The concentrate thaws and flows out of the container leaving the container free of mess and drippings, all within the confines of the pitcher where the container will not get tipped over and spilled. Next, the empty container is neatly removed from the pitcher and used to measure the correct amount of water, which is poured into the pitcher where it mixes with the concentrate. Finally, if additional stirring is needed, the pitcher is tilted back and forth a few times to induce a pumping action between the receptacle and the main chamber. Complete mixing is accomplished without the need for stirring utensiles that drip when removed, and without shaking the pitcher and risking leaks.

SUMMARY OF THE INVENTION

Briefly, this invention is a pitcher which reduces the mess and inconvenience in preparing frozen juice concentrates. More specifically, it comprises a main chamber to hold most of the finally mixed juice, a receptacle to hold the container while the concentate thaws, and a passage to permit the thawed concentrate and concentrate/water mixture to flow between the receptacle and the main chamber.

BRIEF DESCRIPTION OF THE DRAWINGS

FIG. 5 is a longitudinal cross-sectional view similar to FIG. 2 showing another embodiment of the invention.

FIG. 6 is a top plan view similar to FIG. 1 showing still another embodiment of the invention.

FIG. 7 is a longitudinal cross-sectional view taken substantially along line 7—7 of FIG. 6 as viewed in the direction of the arrows.

FIG. 8 is a top plan view similar to FIG. 1 showing a further embodiment of the invention.

FIG. 9 is a longitudinal cross-sectional view taken substantially along line 9—9 of FIG. 8 as viewed in the direction of the arrows.

DESCRIPTION OF THE PREFERRED EMBODIMENTS

Figure 1:
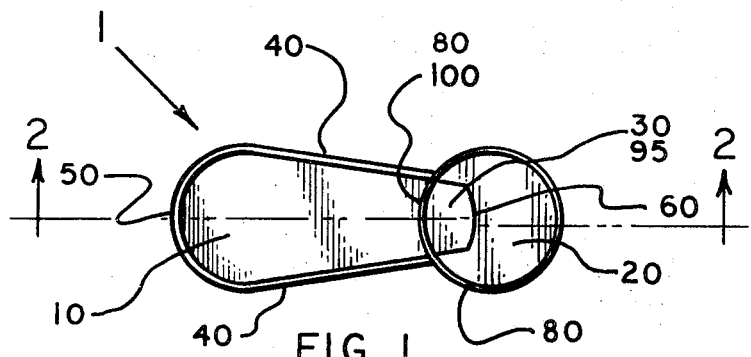
FIG. 1 is a top plan view of one preferred embodiment of the invention.
Figure 2:
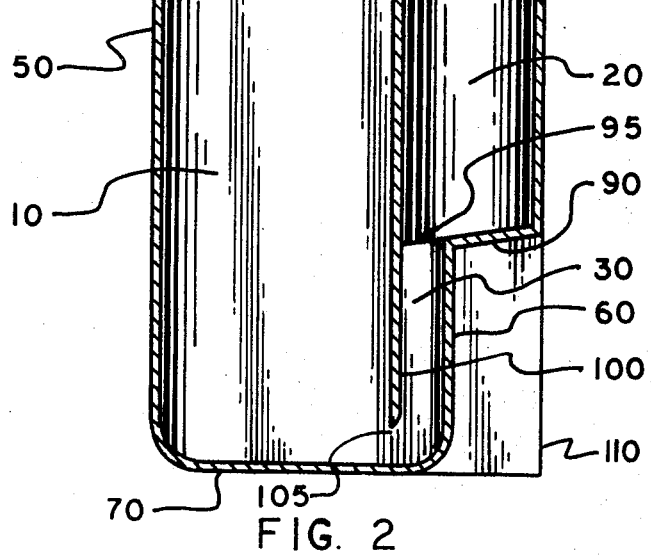
FIG. 2 is a longitudinal cross-sectional view taken substantially along line 2—2 of FIG. 1 as viewed in the direction of the arrows.
Figure 3:
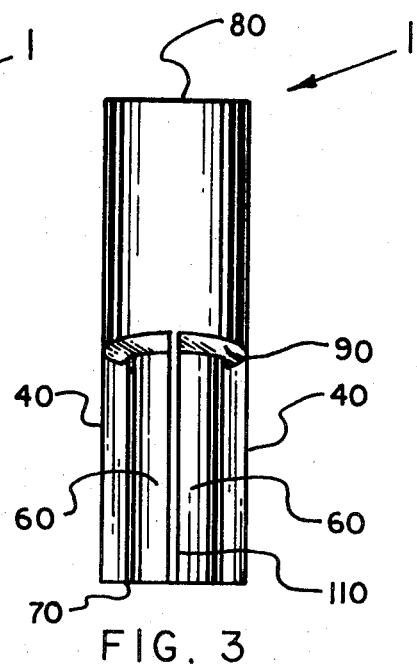
FIG. 3 is a back elevation view of the embodiment shown in FIGS. 1 and 2.
Figure 4:
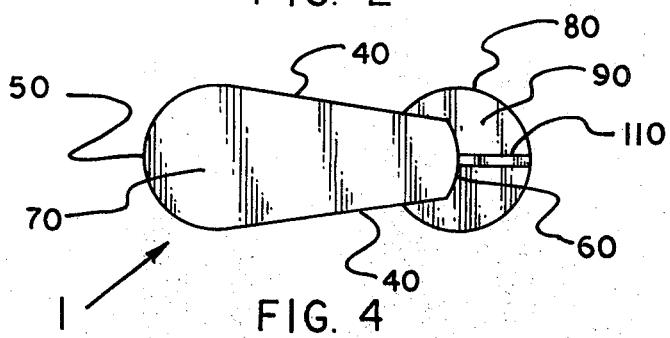
FIG. 4 is a bottom plan view of the same embodiment shown in FIGS. 1, 2, and 3.

FIGS. 1, 2, 3, and 4 show a pitcher embodying one form of the principles of the present invention. In this embodiment the pitcher 1 is comprised of a main chamber 10, a receptacle 20, and a passage 30 therebetween. The main chamber 10 is formed by substantially vertical sidewalls 40, front end wall 50, back end wall 60 and bottom 70. Obviously, the walls 40, 50, and 60, and bottom 70, can be of almost any shape that forms an enclosure suitable for use as a pitcher and to which a receptacle and passage can be adapted. The receptacle 20 is formed by the receptacle wall 80 and the receptacle bottom 90. The receptacle bottom 90 includes an orifice 95 aligned with the passage 30. The passage 30 is formed by the passage wall 100, which in this embodiment is a partial extension of the receptacle wall 80 between the side walls 40, and the back end wall 60. A space is left open at the bottom of the passage 30 to provide an opening 105 from the passage 30 into the main chamber 10.

A back support 110 is included to balance the pitcher when a container of frozen juice concentrate is in the receptacle 20 and the main chamber 10 is empty. Of course, pitchers of other shapes can be used where there is no need for the support 110.

To use the pitcher 1, an open container of frozen juice concentrate is placed in the receptacle 20 with the open end down. As the concentrate thaws it flows downward through the orifice 95 and passage 30 through the opening 105 and into the bottom of the main chamber 10 due to the forces of gravity. After sufficient time has elapsed, for example, if the pitcher 1 is left overnight at a temperature above 32°F, essentially all of the concentrate will be in the bottom of the main chamber 10 and passage 30, and the container can be removed from the receptacle 20 free from dripping concentrate. Water is then poured into the receptacle 20 from which it flows downward through the passage 30 and into the bottom of the main chamber 10. It enters the main chamber 10 with its velocity in a substantially horizontal direction, thus impacting the concentrate and causes it to mix with the water. Even as the level of liquid rises in the pitcher 1, the newly added water enters the main chamber 10 in this manner so that the concentrate, which is heavier than water and lies on the bottom 70, is optimally mixed. This is in contrast to conventional pitchers where as the pitcher is filled, the barrier of water above the unmixed concentrate absorbs the kinetic energy of the water before it can impact the concentrate and cause it to mix.

If additional mixing is needed with the present invention, the pitcher 1 is tilted back and forth in the direction of the receptacle 20. Tilting away from the receptacle 20 causes the receptacle 20 to be elevated with respect to the main chamber 10. Gravitational forces acting on the liquid cause it to flow from the receptacle 20 and through the passage 30 into the main chamber 10 until the top of the fluid level in the main chamber 10 is the same as in the receptacle 20. Tilting toward the receptacle 20 causes liquid to flow from the main chamber 10, through the passage 30, and into the receptacle 20. This pumping action between the receptacle 20 and the main chamber 10 causes a mixing action not available in pitchers having a single cavity.

FIG. 5 illustrates an embodiment of the invention similar to that shown in FIGS. 1 through 4 except that in this latter embodiment the bottom 70 of the main chamber 10 is sloped downwardly toward the opening near the bottom of the passage 30. This downward slope directs the heavier unmixed concentrate toward the opening of the passage 30, thus providing more efficient mixing because the water added through the receptacle 20 impacts the concentrate with more kinetic energy. A front support 120 is shown to improve the balance of the pitcher 1 since without it the pitcher 1 would tend to be unsteady with the sloped bottom 70 of the main chamber 10.. Other features can be incorporated to modify the mixing action, such as flow deflectors in the bottom 70 of the main chamber 10, additional passages between the receptacle 20 or passage 30 and the main chamber 10, different curvatures to the corners near the bottom 70, and the like.

FIGS. 6 and 7 illustrate a more elementary embodiment of the invention. Support means are located within the main chamber 10 and are comprised of two spaced apart arms 130 adapted to support a container of frozen juice concentrate. In this embodiment the thawed concentrate drips directly from the inverted container and into the main chamber 10. Inasmuch as there is no passage or receptacle in this embodiment, there is no mixing due to a pumping action such as described for the embodiments above.

FIGS. 8 and 9 illustrate an embodiment of the invention wherein two main chambers 10 are partially separated by a barrier wall 140 that has an opening 105 that provides a passage between the two chambers 10 substantially near their bottoms 70. In this embodiment there is no receptacle to hold the concentrate while it thaws. However, once thawed, the concentrate can be mixed with water very conveniently by simply tilting the pitcher back and forth toward and away from one of the main chambers 10 to induce a pumping action through the opening 105.

It is obvious that other features commonly found in pitchers, such as handles, lids, pouring spouts, and the like can be added to my invention. To those skilled in the art to which this invention relates, many changes in construction and widely differing embodiments and applications of the invention will suggest themselves without departing from the spirit and scope of the invention. The disclosures and the description herein are purely illustrative and not intended to be in any sense limiting.

I claim:

1. A pitcher for diluting and mixing frozen juice concentrates, comprising:

a main chamber adapted to contain part of the finally mixed juice, means to support a container of frozen juice concentrate, the support means located adjacent the main chamber and adapted to support the lowermost surface of the container substantially above the bottom of the main chamber, said support means further comprising substantially vertical walls that at least partially enclose the container, a bottom adapted to support the container, and at least one orifice, a passage from the at least one orifice in the support means which terminates in at least one opening into the main chamber, and a bottom to the main chamber that slopes downwardly toward the at least one opening near the bottom of the passage, whereby, when a container of frozen juice concentrate is supported by the support means with the open end down and the concentrate is allowed to thaw, the concentrate will flow into the main chamber, and water poured into the receptacle to dilute the thawed juice concentrate will flow downward through the at least one orifice and out the at least one passage opening near its bottom into the main chamber where it will dilute and mix the concentrate, and because of the downward slope of the bottom of the main chamber, the frozen juice concentrate will tend to collect near said opening where the water first enters said main chamber and thereby increase the amount of mixing as the water is added through the receptacle, and when the pitcher is tilted back and forth in the direction of the receptacle a pumping action will occur between the receptacle and the main chamber to produce additional mixing.

2. A pitcher for diluting and mixing frozen juice concentrates, comprising:

a main chamber adapted to contain part of the finally mixed juice, means to support a container of frozen juice concentrate, the support means located adjacent the main chamber and adapted to support the lowermost surface of the container substantially above the bottom of the main chamber, said support means further comprising substantially vertical walls that at least partially enclose the container, a bottom adapted to support the container, and at least one orifice, a passage from the at least one orifice in the support means which terminates in at least one opening into the main chamber, and means to modify the flow of water that flows through the opening in the passage, the flow modifying means adapted to increase the amount of mixing when the water is added through the receptacle and subsequently flows out of the opening of the passage near the bottom of the main chamber, whereby, when a container of frozen juice concentrate is supported by the support means with the open end down and the concentrate is allowed to thaw, the concentrate will flow into the main chamber, and water poured into the receptacle to dilute the thawed juice concentrate will flow downward through the at least one orifice and out the at least one passage opening near its bottom into the main chamber where it will dilute and mix the concentrate, and when the pitcher is tilted back and forth in the direction of the receptacle a pumping action will occur between the receptacle and the main chamber to produce additional mixing.

3. A pitcher for diluting and mixing frozen juice concentrates, comprising:

a main chamber adapted to contain part of the finally mixed juice, the main chamber having substantially vertical front, side, and back walls, the side walls being substantially the same height as the front wall, and the back wall being less than two-thirds the height of the front wall, a receptacle adapted to receive a container of frozen juice concentrate, the receptacle having substantially vertical side walls adapted to at least partially enclose the container of frozen juice concentrate and a bottom adapted to support said container, said receptacle located above the back wall of the main chamber so as to extend the height of the back wall to be substantially the same height as the front wall, and the bottom having an orifice above the area defined by the side and rear walls of the main chamber located underneath, a downward extension beneath the front of the receptacle located between the side walls of the main chamber and terminating above the bottom of the main chamber, a passage adapted to connect the orifice in the bottom of the receptacle to the proximity of the bottom of the main chamber, the passage comprising the rear wall of the main chamber, those portions of the side walls of the main chamber located underneath the bottom of the receptacle, and the downward extension which terminates above the bottom of the main chamber thereby providing an opening from the passage into the main chamber near the bottom of the main chamber, whereby, when the lid is removed from the container of frozen juice and the container is placed in the receptacle with the open end down and the concentrate is allowed to thaw, the concentrate will pass through the orifice in the bottom of the receptacle and down through the passage and out through the opening near the bottom of the passage, and when water is poured into the receptacle to dilute the juice concentrate it will follow the same path into the bottom of the main chamber where it will dilute the concentrate and cause mixing of the water/concentrate mixture, and when the pitcher is tilted back and forth in the direction of the receptacle a pumping action between the receptacle and the main chamber will produce additional mixing.

4. A pitcher for mixing and diluting frozen juice concentrates, comprising:

a first chamber adapted to contain part of the finally mixed concentrate, a second chamber adapted to contain the remaining part of the finally mixed concentrate, isolation means adapted to at least partially separate the interior of the first chamber from the interior of the second chamber, the isolation means extending vertically downward to within close proximity of the deepest portion of the pitcher, and at least one passage through the isolation means in communication with the interiors of both chambers, the passage adapted to pass the mixed concentrate back and forth between the interiors of the two chambers when the pitcher is tilted toward and away from at least one of the chambers, and the at least one passage located near the bottom of the isolation means such that flow between the two chambers occurs along the bottom of the pitcher where the heavier concentrate tends to collect, thereby causing the heavier concentrate to be mixed when the pitcher is tilted back and forth.

* * * * *